United States Patent [19]
Thomas

[11] 3,781,547
[45] Dec. 25, 1973

[54] OPTICAL RECEIVER WITH EXTENDED SOURCE DISCRIMINATION

[75] Inventor: Charles T. Thomas, Dallas, Tex.

[73] Assignee: The United States of America as represented by the Secretary of the Air Force, Washington, D.C.

[22] Filed: Nov. 22, 1972

[21] Appl. No.: 308,888

[52] U.S. Cl............... 250/203 R, 250/233, 250/342
[51] Int. Cl. .............................................. G01j 1/20
[58] Field of Search................ 250/203 R, 233, 334, 250/342

[56] References Cited
UNITED STATES PATENTS

| | | | |
|---|---|---|---|
| 2,997,588 | 8/1961 | Wilcox, Jr. | 250/203 X |
| 3,220,298 | 11/1965 | Powell et al. | 250/233 X |
| 3,272,985 | 9/1966 | Hayes | 250/203 X |
| 3,418,477 | 12/1968 | Falbel | 250/342 X |

*Primary Examiner*—Walter Stolwein
*Attorney*—Harry A. Herbert, Jr. et al.

[57] ABSTRACT

An optical receiver comprising a lens system for forming an image of a distant light source at its focal plane. The light on either side of the focal plane is intercepted by a reticle of alternate opaque and transparent strips of equal widths which move at constant speed and always in the same direction across the light while the reticle continuously oscillates back and forth along the optical axis between extreme positions one of which is in the focal plane of the lens. A photodetector converts the light transmitted by the reticle into a proportionate electrical signal. An inhibit gate located between the output of the photodetector and the receiver output circuit is made to respond to the presence of an amplitude modulation of the AC component of the photodetector output at either the oscillating frequency of the reticle or twice this frequency to prevent an output from the receiver when either of these modulations is present.

3 Claims, 6 Drawing Figures

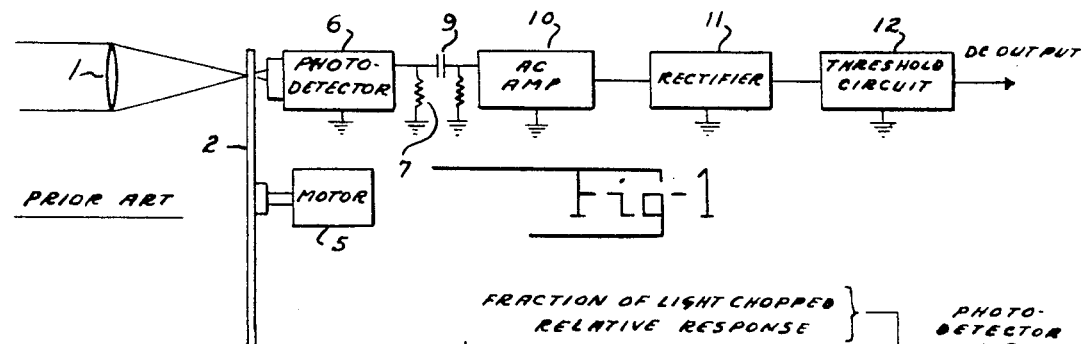
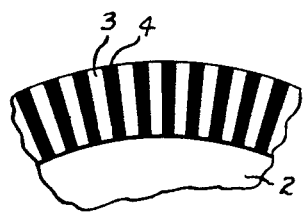
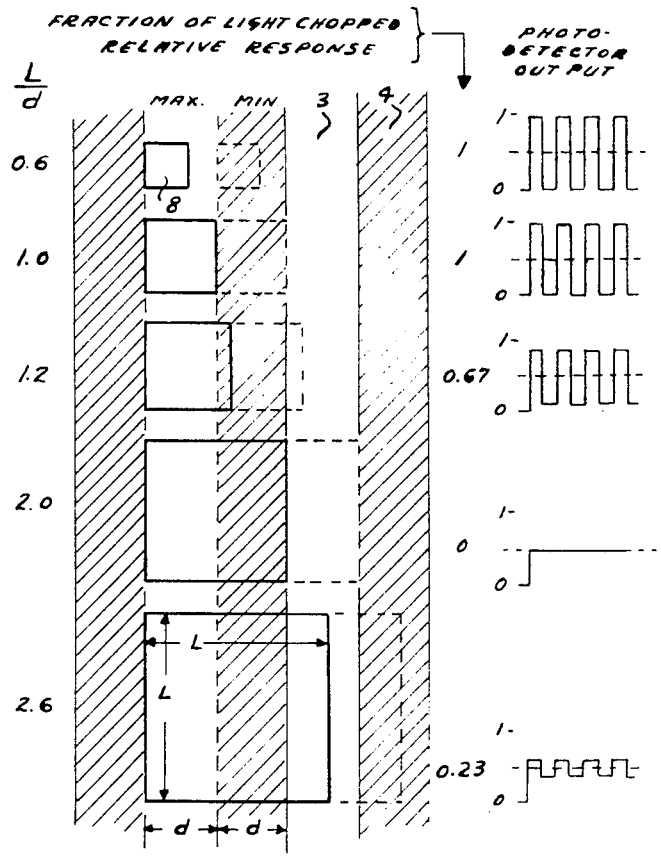
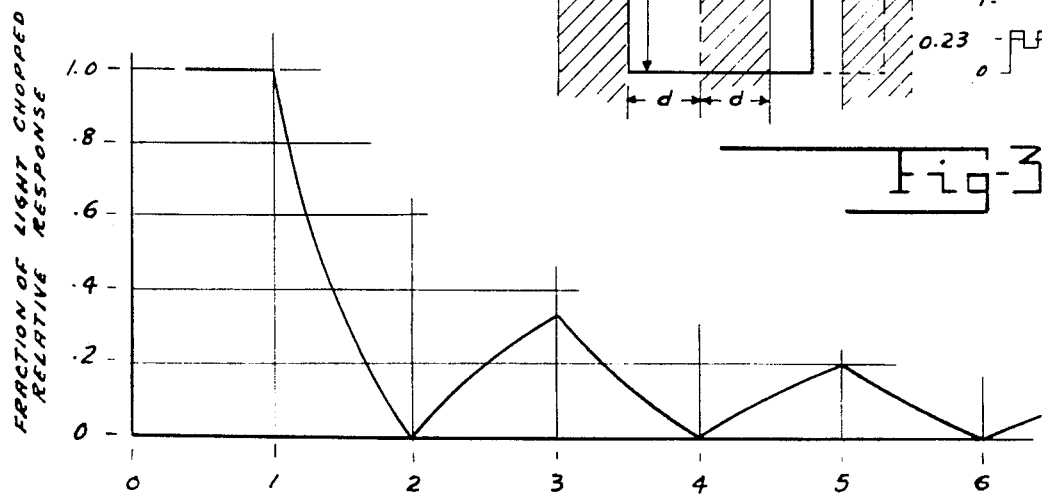

OPTICAL RECEIVER WITH EXTENDED SOURCE DISCRIMINATION

BACKGROUND OF THE INVENTION

This invention pertains to the optical detection of distant luminous sources which appear small when viewed from the detector and are generally referred to as point sources. In particular, the invention is concerned with point source detectors that are capable of discriminating against extended light sources, or sources that appear relatively large when viewed from the detector. An example would be the detection of a distant apparently small light source against a background of sunlit clouds.

Optical receivers for the detection of point sources are known which seek to discriminate against extended sources by means of a chopping reticle. The chopping reticle is usually a rotating disc having at its edge adjacent narrow radial strips that are of equal widths and alternately transparent and opaque. The disc is positioned in the focal plane of the receiver lens so that an image of the distant source is formed on the reticle. A photoelectric detector converts the light passing through the reticle into an electric current that has an alternating component due to the chopping of the light by the alternate transparent and opaque strips. When the size of the image is equal to or less than the width of the strips all of the light is chopped and the amplitude of the alternating component equals the average value of the detector output current. As the image size exceeds the width of the strips, the fraction of the total light in the image that is chopped decreases with the result that the ratio of the amplitude of the alternating component to the average value of the signal decreases, reaching a value of zero at an image size that is twice the width of a recticle strip. As the image size increases beyond this point, the ratio rises toward a new maximum at an image size three times the reticle strip width, which maximum however has a value of only one-third. Similarly the ratio continues to pass through values of zero at the higher even multiples of the reticle strip size and through decreasing maxima at the higher odd multiples of the strip size, as will be described in more detail later. A system of this type provides a certain degree image size discrimination in the above described dependency of the ratio of the alternating component of the photodetector output current to the average value of the current on image size. Since this ratio has its maximum value of unity for images equal to or smaller than a reticle strip width and rapidly decreases for images larger than a reticle strip width, a threshold device may be used to produce an output from the receiver only when the image size does not exceed the strip dimension. However, this requires the complication of apparatus for deriving the ratio of the alternating component of the photodetector output current to its average value. More simply, the alternating component alone may be measured but this gives ambiguous results since the amplitude of this component depends both upon the image size and the total light flux in the image.

SUMMARY OF THE INVENTION

The purpose of the invention is to provide an optical receiver for the detection of distant light sources which produces no output if the image of the light source exceeds a predetermined size regardless of the total light flux in the image.

Briefly, this result is accomplished by the use of an optical system with a rotating reticle as described above in which a slight wobble is imparted to the reticle so that the reticle surface coincides with the focal plane of the lens at only one point in its rotational cycle. Where the size of the image of the light source on the reticle does not exceed the width of a reticle strip even in its most defocused state, i.e., when the reticle has its maximum displacement from the focal plane, all of the light is chopped throughout the rotational cycle of the reticle and the ratio of the alternating component to the average value of the detector output is unity throughout the cycle. Under this condition there is no amplitude modulation of the detector output at the rotational frequency. On the other hand, if the image size is such that it exceeds the reticle strip width during part or all of the rotational cycle the ratio of the alternating component to the average value of the detector output varies during the cycle. This causes an amplitude modulation of the detector output at the rotational frequency or, in some special cases, at twice the rotational frequency. An inhibiting circuit responsive to these two frequencies is used to prevent an output from the receiver whenever either of these frequencies is present in the detector output. In this manner the receiver produces an output only for light sources having images less than a size determined by the reticle strip width. By making the reticle dimension small enough, the receiver will discriminate against all but essentially "point sources."

BRIEF DESCRIPTION OF THE DRAWING

FIG. 1 is an example of the prior art,
FIG. 2 shows the construction of a chopping reticle,
FIG. 3 shows the effect of image size relative to reticle strip width of the photodetector output current,
FIG. 4 is a graph showing both the fraction of light chopped and the relative response versus the ratio of the image size L to the reticle strip width $d$.

DETAILED DESCRIPTION

Figure 5:
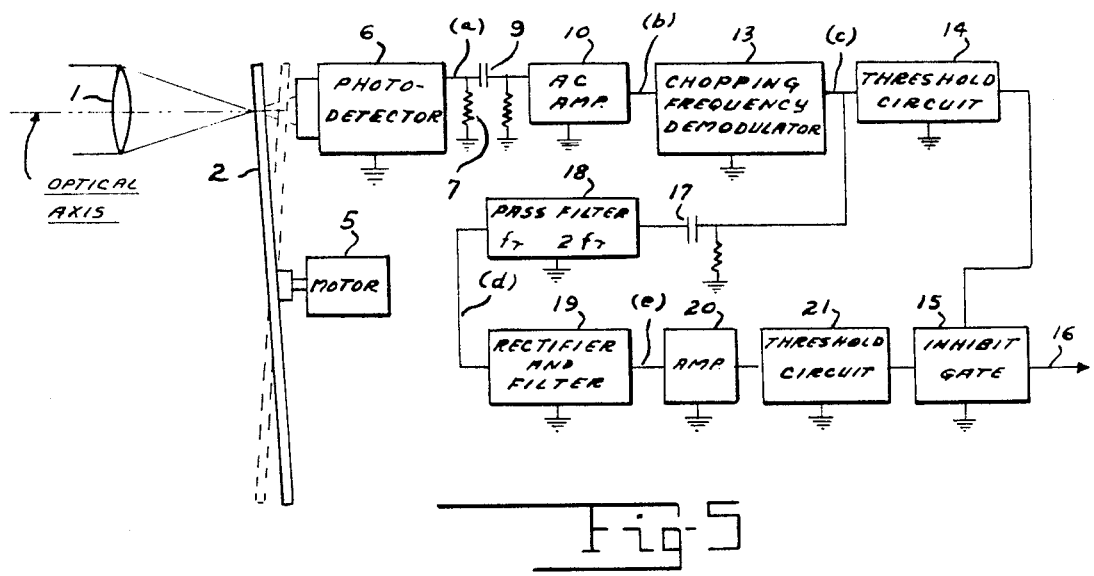
FIG. 5 shows an optical receiver incorporating the invention.

Referring to the prior art system shown in FIG. 1, light from a distant source is focused by lens 1 on the surface of disc 2 which surface has on it a reticle of alternate transparent and opaque sectorial strips 3 and 4 of equal widths, as seen in FIG. 2. The disc is rotated at constant speed by motor 5. Light passing the reticle is collected by photoelectric detector 6 which produces an output current in load resistor 7 proportional to the total light flux.

The effect of the size of the image relative to the width of the reticle strips may be seen in FIG. 3. In this figure the images are shown as squares for simplicity. Further, the total light flux constituting the image is the same for all images, as would be the case where the smallest image 8 represents the properly focused image at the focal plane of lens 1 and the other images represent various degrees of defocus of the light source image occuring at increasing distances from the focal plane. As will be seen later, this is the situation that exists in the invention. In the drawing the image is shown in solid outline when its position relative to the reticle provides maximum light transmission and in dotted outline when its position provides minimum light transmission.

The average value of light transmitted by the reticle and reaching the photodetector is constant and independent of the ratio $L/d$, where L is the width of the square image and $d$ is the width of a reticle strip. The maximum and minimum values of light transmitted, however, depend upon the value of $L/d$. When this ratio is equal to or less than unity the maximum value of light transmitted equals total light in the image and the minimum value is zero, or, in other words, all of the light is chopped by the reticle. This gives rise to a photodetector output current that alternates, like the transmitted light, between maximum and zero values, in which case the amplitude of the alternating component of the current equals the average value of the current represented in FIG. 3 by the dotted line. The ratio of the alternating component of the photodetector output current to the average value of the current, designated the relative response of the receiver, in this case is maximum and is designated "1," which also represents the fraction of the total light in the image that is chopped by the reticle. This situation is represented in FIG. 3 for values of $L/d$ equal to 0.6 and 1.0. As the value of $L/d$ increases above unity the maximum and minimum values of light transmitted respectively decrease and increase equally toward the average value thus reducing the amplitude of the alternating component without changing the average value of the detector output. An example is given in FIG. 3 for $L/d = 1.2$, for which the relative response and fraction of light chopped have fallen to 0.67. This process continues until at $L/d = 2$ the maximum and minimum values of transmitted light and detector output are both equal to the average value and the alternating component is zero, as illustrated in the drawing. Above $L/d = 2$, the maximum and minimum values of transmitted light and detector output increase and decrease respectively from the average value giving an increasing value of relative response until a maximum is reached at $L/d = 3$. An example at $L/d = 2.6$, for which the relative response is 0.23, is shown in the drawing. FIG. 4 is a continuous graph showing relative response as a function of $L/d$ for values of the latter from below unity above 6. As seen in the graph, the relative response is zero at values of $L/d$ equal to the even integers and has decreasing maxima at values of $L/d$ equal to the odd integers.

The prior art receiver of FIG. 1 operates in the simpler of the two modes previously mentioned, i.e. it does not derive the ratio of the AC component of the photodetector output to the average value of the output but measures the AC component only. The AC component is applied through capacitor 9 to AC amplifier 10 the response of which is peaked at the chopping frequency. The chopping frequency in hertz is equal to the product of the number of transparent or opaque strips in the reticle and the speed of disc 2 in revolutions per second. Rectifier 11 produces a direct voltage proportional to the amplitude of the amplifier 10 output. Threshold circuit 12 produces an output only when the rectifier output magnitude exceeds a preset threshold. As seen in FIGS. 3 and 4 the alternating component drops off rapidly as the image size exceeds the reticle strip width. Therefore, the threshold can be adjusted so that the receiver produces an output only when the image size does not appreciably exceed the strip width. As stated earlier, since the amplitude of the alternating component is affected by the total light flux in the image as well as by image size relative to reticle strip size, the receiver of FIG. 1 gives unambiguous results only when the light flux is equal in all images, the situation illustrated in FIG. 3.

Figure 6:
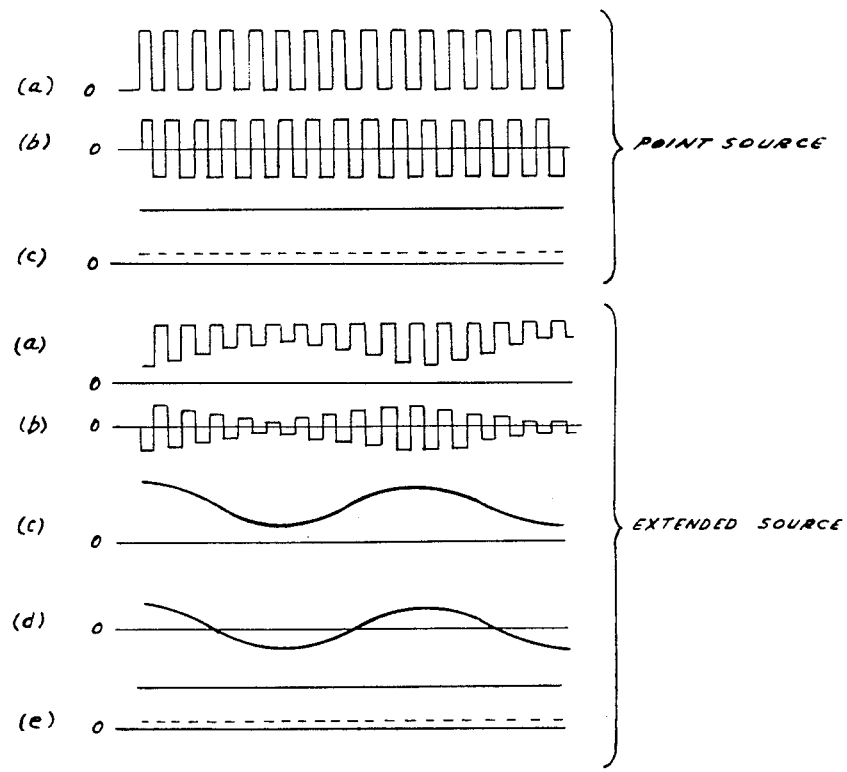
FIG. 6 shows waveforms occuring in the receiver of FIG. 5.

The optical receiver of FIG. 5, constructed in accorance with the invention, produces an output only when the image size does not exceed a predetermined size regardless of the total amount of light flux in the image. In this receiver, the lens system 1 and the disc 2 and associated reticle are the same as in FIGS. 1 and 2 except that disc 2 is mounted at an angle to the shaft of motor 5 so as to impart a slight wobble to the disc. The arrangement is such that when disc 2 has its nearest or its farthest position relative to the lens the point at which the reticle is pierced by the optical axis of the lens lies in the focal plane of the lens. In the drawing this occurs at the nearest position, shown in solid outline. 180° later in the rotational cycle the disc is at its other extreme, shown in dotted outline in the drawing, and the point at which the optical axis pierces the reticle has its maximum displacement from the focal plane. If the image of the light source on the reticle is small enough that it does not exceed the reticle strip width in its most defocused state, i.e., when the disc 2 has the position shown in dotted outline in FIG. 5, the ratio $L/d$ does not exceed unity and all of the light is chopped throughout the rotational cycle. Therefore, as seen in FIGS. 3 and 4, the AC component of the photodetector output is constant and has its maximum value, which is equal to the average value of the signal, throughout the rotational cycle. In this case the waveforms at points (a), (b) and (c) in FIG. 5 are as shown in the "point source" portion of FIG. 6. The demodulator 13 is simply a rectifier and low pass filter which removes the chopping frequency components. The output of the demodulator in this case is a direct voltage of constant magnitude throughout the rotational cycle of the disc 2. This signal passes threshold circuit 14 and inhibit gate 15 to output circuit 16. Consequently, a light source producing an image that does not exceed the strip width of the reticle throughout the rotational cycle of disc 2 produces a DC output from the receiver and with a sufficiently small reticle strip width, such outputs may be limited to point sources.

If the light source is large enough that its image size exceeds the reticle strip width during all or a substantial part of the rotational cycle of disc 2, the ratio $L/d$ will exceed unity during all or part of the cycle and, as seen in FIGS. 3 and 4, the amplitude of the AC component will vary with the value of $L/d$ during the cycle. Where the slope of the curve in FIG. 4 does not change sign within the range of variation of $L/d$, the fundamental frequency of this amplitude modulation of the AC component equals the rotational frequency $f_r$ of disc 2. Where the slope changes sign within the range of variation of $L/d$, the fundamental frequency is twice the rotational frequency or $2f_r$. Capacitor 17 blocks the DC component in the output of demodulator 13 and filter 18 blocks all other components except those at the frequencies $f_r$ and $2f_r$. If either or both of these components are present, there is a DC output from rectifier 19 which is amplified in amplifier 20 and applied through threshold circuit 21 to inhibit gate 15 to close this gate and thereby prevent the output of threshold circuit 14 from reaching receiver output circuit 16. The waveforms at points (a)–(e) for a situation where the ratio $L/d$ is greater than unity throughout the rotational cycle and the slope of the curve in FIG. 4 does not change sign over the range of variation of $L/d$ are illustrated in the "extended source" portion of FIG. 6.

The output of the optical receiver in FIG. 5 is therefore inhibited whenever the light source image is large enough to produce an amplitude modulation at $f_r$ or $2f_r$ of the AC component of the photodetector output in the above described manner. For smaller light sources, i.e. light sources for which $L/d$ does not exceed unity during the rotational cycle of the disc, there is no amplitude modulation produced and the receiver output is not inhibited. The receiver as a result discriminates against light sources exceeding a predetermined maximum apparent size dependent, for a given lens system, upon the width of a reticle strip. Sources which do not exceed the predetermined maximum size may be further discriminated as to total received light flux by an appropriate setting of the threshold of circuit 14. Threshold circuit 21 may be used as a "noise" discriminator to prevent low level spurious signals from inhibiting gate 15.

I claim:

1. An optical receiver comprising a lens system for forming an image of a distant light source at its focal plane; a chopping reticle of alternate opaque and transparent strips of equal widths; means for imparting two simultaneous motions to said reticle, one motion constituting a continuous oscillation of the reticle back and forth along the optical axis of the lens between two extreme positions one of which is in the focal plane of the lens, and the other motion constituting a continuous constant speed movement of said strips in a direction normal to the strips and to the optical axis of the lens; a photodetector receiving the light transmitted by the reticle and converting said light into a proportionate electrical signal in its output circuit, said signal having an alternating component due to the light chopping effect of the reticle; a receiver output circuit; a signal transmission circuit including a normally transmitting gate circuit coupled between the photodetector output circuit and the receiver output circuit; and means responsive to amplitude modulation of the alternating component of the photodetector output signal at either the oscillation frequency of said article or twice this frequency to inhibit signal transmission through said gate during the presence of said modulation.

2. Apparatus as claimed in claim 1 in which said reticle and said means for imparting two simultaneous motions thereto comprise: a disc having said alternate opaque and transparent strips in the form of a band of sectorial strips at its periphery, said disc being mounted at its center on a shaft with the angle between the disc and the shaft slightly less than 90° in order to impart a wobble to the disc when the shaft is rotated, said shaft being parallel to the optical axis of the lens and spaced therefrom as required for the optical axis to pass through said band of strips, and means for rotating said shaft at constant speed.

3. Apparatus as claimed in claim 2 in which the last named means of said claim comprises: a demodulator situated in said signal transmission circuit between the photodetector output circuit and said gate circuit for deriving the amplitude modulation of the alternating component of the photodetector output signal; a filter passing only the said oscillation frequency of said reticle and twice that frequency; means for rectifying the output of said filter to produce a direct inhibit voltage; and means for applying said inhibit voltage to said gate for preventing signal transmission therethrough in the presence of the inhibit voltage.

* * * * *